United States Patent
Lu et al.

(10) Patent No.: US 8,797,917 B2
(45) Date of Patent: Aug. 5, 2014

(54) SYSTEM AND METHOD FOR NEGOTIATING APPLICATION SUPPORTING ABILITY BETWEEN TERMINAL AND BASE STATION (BS)

(75) Inventors: Ting Lu, Shenzhen (CN); Yuanfang Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 176 days.

(21) Appl. No.: 13/514,514

(22) PCT Filed: Jan. 21, 2011

(86) PCT No.: PCT/CN2011/070476
§ 371 (c)(1),
(2), (4) Date: Jun. 7, 2012

(87) PCT Pub. No.: WO2011/088798
PCT Pub. Date: Jul. 28, 2011

(65) Prior Publication Data
US 2012/0243482 A1 Sep. 27, 2012

(30) Foreign Application Priority Data
Jan. 22, 2010 (CN) .......................... 2010 1 0105040

(51) Int. Cl.
*H04W 4/00* (2009.01)
*H04W 28/18* (2009.01)
(52) U.S. Cl.
CPC ..................................... *H04W 28/18* (2013.01)
USPC .......................................... 370/254; 370/328
(58) Field of Classification Search
CPC ........ H04L 12/66; H04L 67/14; H04W 28/18
USPC ................................. 370/328, 254
See application file for complete search history.

(56) References Cited

FOREIGN PATENT DOCUMENTS

| CN | 1937489 A | 3/2007 |
|---|---|---|
| WO | WO 2007/105922 A1 | 9/2007 |

OTHER PUBLICATIONS

"E-UTRAN—cdma2000 HRPD Connecitivity and Interworking: Air Interface Specification" ARIB STD-T64-C.S0087-0 V2.0. Jan. 27, 2009.*
"3rd Generation Partnership Project 2 '3GPP2'", E-UTRAN—cdma2000 HRPD Connectivity and Interworking: Air Interface Specification, Revision 0 v2.0, 3GPP2 C.S0087-0, Version 2.0, 409 pgs. (Jan. 2010).
International Search Report from corresponding PCT application PCT/CN2011/070476, mailed Apr. 28, 2011 (with English translation).

* cited by examiner

*Primary Examiner* — Chirag Shah
*Assistant Examiner* — Jenkey Van
(74) *Attorney, Agent, or Firm* — IPLM Group, P.A.

(57) ABSTRACT

The present invention discloses a method for a terminal to negotiate application support ability with a base station. The method comprises identifying application subtypes using different subtype values during session negotiation between the terminal and base station. The present invention further discloses a system for a terminal to negotiate application support ability with a base station, wherein the terminal is configured to identify the terminal supported application subtypes using different subtype values during session negotiation with the base station, and/or recognize the base station supported application subtypes identified using different subtype values by the bases station; and the base station is configured to recognize the terminal supported application subtypes identified using different subtype values by the terminal during session negotiation with the terminal, and/or identify the base station supported application subtypes using different subtype values.

2 Claims, 3 Drawing Sheets

SYSTEM AND METHOD FOR NEGOTIATING APPLICATION SUPPORTING ABILITY BETWEEN TERMINAL AND BASE STATION (BS)

TECHNICAL FIELD

The present invention relates to the communication field, and in particularly, to a system and method for a terminal to negotiate application supportability with a base station.

BACKGROUND OF THE RELATED ART

Interoperation between a subsequent evolution network of the code division multiple access (CDMA for short) network and the long term evolution (LTE for short) network is a trend of network development. However, evolution from the commercial CDMA network to the LTE network will be a complicated replacement process. Moreover, in this replacement process, there will be a very long coexistence period, during which these two wireless networks will be interconnected and intercommunicated.

Currently, the 3GPP2 related work group has formulated the LTE-High Rate Packet Data (HRPD) interoperation specification C.S0087 for supporting interconnection and intercommunication of the two networks described above. According to requirements proposed by operators at different stages, the formulation of this interoperation specification also experiences two stages. Achievement in the first stage is Version C.S0087-0_v1.0, which mainly supports idle to activation switching of an access terminal from a LTE system to a HRPD RevA system, and achievement in the second stage is Version C.S0087-0_v2.0, which adds support to reselection of the access terminal in an idle state from the HRPD system to the LTE system on the basis of the first version. In addition, the second version not only supports interoperation between the LTE and HRPD RevA systems, but also supports an interoperation function between the LTE and HRPD RevB systems.

In the C.S0087 specification, in order to ensure that the terminal has the ability to attach to a core network having interoperation ability, the air interface application layer protocol is required to be capable of supporting multiple packet data network (PDN) operation, i.e. the terminal should identify its support to ProtocolID 0x07 in high layer protocol attributes that it supports. The definition of ProtocolID 0x07 is contained in additional CDMA spread spectrum system management parameter protocol C.R1001 (see Version G).

When Version 1.0 of the C.S0087 specification is formulated, it is believed that interoperation requirements are mainly for real-time multimedia services. Therefore, only an enhanced multi-flow packet application bound to a service network subtype (enhanced multi-flow packet application subtype, i.e. EMPA, for short hereinafter, and its corresponding subtype value is 0x0009) is enhanced. When the terminal negotiates the ATSupportedFlowProtocolParametersPP attribute with a base station, the terminal is required to identify its support to ProtocolID 0x07 in this attribute.

Both an ordinary HRPD terminal capable of supporting the enhanced multi-flow packet application subtype and a HRPD terminal capable of supporting interoperation (eHRPD terminal for short) will contain the enhanced multi-flow packet application subtype into the ATSupportedApplicationSubtypes attribute at the beginning of session negotiation. In order to ensure that the base station can distinguish between the two terminals having different abilities described above, the C.R1001 specification defines a new alternate enhanced multi-flow packet application for eHRPD subtype (alternate enhanced multi-flow packet application subtype for short hereinafter, and its corresponding subtype value is 0xFFFE). When the terminal can report the alternate enhanced multi-flow packet application subtype in addition to the enhanced multi-flow packet application subtype, it is indicated that the enhanced multi-flow packet application subtype supported by the terminal can support an interoperation function, i.e. multi-PDN operation.

When version 2.0 of the C.S0087 specification is formatted subsequently, in order to support the HRPD RevB Version and further improve support to the HRPD RevA Version, a multi-flow packet application bound to a service network subtype (multi-flow packet application subtype, i.e. MPA, for short hereinafter, and its corresponding subtype value is 0x0005) and a multi-link multi-flow packet application bound to a service network subtype (multi-link multi-flow packet application subtype, i.e. MLMPA, for short hereinafter, and its corresponding subtype value is 0x000D) are enhanced as well. That is, for the MPA, when the terminal negotiates the SupportedHigherProtocolParameters attribute with the base station, the terminal is required to identify its support to ProtocolID 0x07 in this attribute, and for MLMPA, when the terminal negotiates the SupportedFlowProtocolParametersPP attribute with the base station, the terminal is required to identify its support to ProtocolID 0x07 in this attribute.

Similarly, in order to ensure the base station has an ability to distinguish the ordinary HRPD terminal capable of supporting the enhanced multi-flow packet application subtype from the eHRPD terminal capable of supporting interoperation, the C.R1001 specification is required to define a new eHRPD support null packet application subtype (null packet application subtype for short hereinafter, and its corresponding subtype value is 0xFFFE). When the terminal negotiates the ATSupportedApplicationSubtypes attribute with the base station, this application subtype should be contained, mainly indicating that the terminal supported multi-flow packet application subtype, enhanced multi-flow packet application subtype, and multi-link multi-flow packet application subtype all support the interoperation function, i.e. multi-PDN operation.

By analysis of protocol version evolution, it can be seen clearly that the value of the null packet application subtype introduced into Version C.S0087-0_v2.0 reuses the value of the alternate enhanced multi-flow packet application subtype introduced into Version C.S0087-0_v1.0. The present invention found that the above embodiments may introduce compatibility problem. For example, when a terminal supporting Version C.S0087-0_v1.0 access to a base station supporting Version C.S0087-0_v2.0, if the terminal carries an application subtype with the value being 0xFFFE when negotiating the ATSupportedApplicationSubtypes attribute, it is possible that the base station wrongly understands that the terminal supported multi-flow packet application subtype, enhanced multi-flow packet application subtype, and multi-link multi-flow packet application subtype can all support the interoperation function. Furthermore, it is possible that the base station selects to bind other application subtypes except the enhanced multi-flow packet application subtype to service flows for subsequent operation. The base station originally expects this application subtype to be able to meet support to multi-PDN, however, the terminal does not have such an ability actually. If the base station can know that the terminal only provides the interoperation function to the enhanced multi-flow packet application subtype, then the base station can select to bind correctly the enhanced multi-flow packet application subtype to the service flows for subsequent operation.

CONTENT OF THE INVENTION

A technical problem to be solved by the present invention is to provide a system and method for a terminal to negotiate application support ability with a base station, so as to overcome the compatible problem existing in the prior art.

In order to solve the above problem, the present invention provides a method for a terminal to negotiate application support ability with a base station comprising:

identifying application subtypes using different subtype values during session negotiation between the terminal and base station.

During the session negotiation between the terminal and base station, a null packet application subtype and an alternate enhanced multi-flow packet application subtype are identified using different subtype values.

The alternate enhanced multi-flow packet application subtype indicates that an enhanced multi-flow packet application subtype has interoperation ability.

The null packet application subtype indicates that a multi-flow packet application subtype, an enhanced multi-flow packet application subtype, and a multi-link multi-flow packet application subtype all have the interoperation ability.

The null packet application subtype is identified using 0xFFFD, and the alternate enhanced multi-flow packet application subtype is identified using 0xFFFE, or the null packet application subtype is identified using 0xFFFE, and the alternate enhanced multi-flow packet application subtype is identified using 0xFFFD.

During the session negotiation between the terminal and base station, the following application subtypes are identified using different subtype values:

an alternate enhanced multi-flow packet application subtype, an alternate multi-flow packet application subtype, and an alternate multi-link multi-flow packet application subtype.

The alternate enhanced multi-flow packet application subtype indicates that the enhanced multi-flow packet application subtype has the interoperation ability.

The alternate multi-flow packet application subtype indicates that the multi-flow packet application subtype has the interoperation ability.

The alternate multi-link multi-flow packet application subtype indicates that the multi-link multi-flow packet application subtype has the interoperation ability.

The alternate multi-flow packet application subtype is identified using any one of 0xFFFE, 0xFFFD, or 0xFFFC.

The alternate multi-flow packet application subtype is identified using any one of 0xFFFE, 0xFFFD, or 0xFFFC, and a value identifying the alternate multi-flow packet application subtype is different from a value identifying the alternate enhanced multi-flow packet application subtype.

The alternate multi-link multi-flow packet application subtype is identified using any one of 0xFFFE, 0xFFFD, or 0xFFFC, and a value identifying the alternate multi-link multi-flow packet application subtype is different from a value identifying the alternate enhanced multi-flow packet application subtype and a value identifying the alternate multi-flow packet application subtype.

In order to solve the above problem, the present invention also provides a method for a terminal to negotiate application support ability with a base station comprising:

identifying a null packet application subtype and an alternate enhanced multi-flow packet application subtype using different subtype values during session negotiation between the terminal and base station.

The alternate enhanced multi-flow packet application subtype indicates that an enhanced multi-flow packet application subtype has interoperation ability.

The null packet application subtype indicates that a multi-flow packet application subtype, an enhanced multi-flow packet application subtype, and a multi-link multi-flow packet application subtype have the interoperation ability.

A value set for the null packet application subtype is 0xFFFD, and a value set for the alternate enhanced multi-flow packet application subtype is 0xFFFE, or a value set for the null packet application subtype is 0xFFFE, and a value set for the alternate enhanced multi-flow packet application subtype is 0xFFFD.

In order to solve the above problem, the present invention also provides a method for a terminal to negotiate application support ability with a base station comprising:

identifying the following application subtypes using different subtype values during session negotiation between the terminal and base station:

an alternate enhanced multi-flow packet application subtype, an alternate multi-flow packet application subtype, and an alternate multi-link multi-flow packet application subtype.

The alternate enhanced multi-flow packet application subtype indicates that an enhanced multi-flow packet application subtype has interoperation ability.

The alternate multi-flow packet application subtype indicates that a multi-flow packet application subtype has the interoperation ability.

The alternate multi-link multi-flow packet application subtype indicates that a multi-link multi-flow packet application subtype has the interoperation ability.

The alternate multi-flow packet application subtype is identified using any one of 0xFFFE, 0xFFFD, or 0xFFFC.

The alternate multi-flow packet application subtype is identified using any one of 0xFFFE, 0xFFFD, or 0xFFFC, which is different from a value of the alternate enhanced multi-flow packet application subtype.

The alternate multi-link multi-flow packet application subtype is identified using any one of 0xFFFE, 0xFFFD, or 0xFFFC, which is different from a value of the alternate enhanced multi-flow packet application subtype and a value of the alternate multi-flow packet application subtype.

In order to solve the above problem, the present invention also provides a system for a terminal to negotiate application support ability with a base station, the system comprising a terminal and a base station.

The terminal is configured to identify the terminal supported application subtypes using different subtype values during session negotiation with the base station, and/or recognize the base station supported application subtypes identified using different subtype values by the bases station.

The base station is configured to recognize the terminal supported application subtypes identified using different subtype values by the terminal during session negotiation with the terminal, and/or identify the base station supported application subtypes using different subtype values.

The terminal and base station are configured to identify a null packet application subtype and an alternate enhanced multi-flow packet application subtype using different subtype values during the session negotiation between the terminal and base station.

The alternate enhanced multi-flow packet application subtype indicates that an enhanced multi-flow packet application subtype has interoperation ability.

The null packet application subtype indicates that a multi-flow packet application subtype, an enhanced multi-flow packet application subtype, and a multi-link multi-flow packet application subtype have the interoperation ability.

The terminal and base station identify the null packet application subtype using 0xFFFD, and identify the alternate enhanced multi-flow packet application subtype using 0xFFFE, or the terminal and base station identify the null packet application subtype using 0xFFFE, and identify the alternate enhanced multi-flow packet application subtype using 0xFFFD.

The terminal and base station are configured to identify the following application subtypes using different subtype values during the session negotiation between the terminal and base station:

an alternate enhanced multi-flow packet application subtype, an alternate multi-flow packet application subtype, and an alternate multi-link multi-flow packet application subtype.

The alternate enhanced multi-flow packet application subtype indicates that the enhanced multi-flow packet application subtype has the interoperation ability.

The alternate multi-flow packet application subtype indicates that the multi-flow packet application subtype has the interoperation ability.

The alternate multi-link multi-flow packet application subtype indicates that the multi-link multi-flow packet application subtype has the interoperation ability.

The alternate enhanced multi-flow packet application subtype is identified using any one of 0xFFFE, 0xFFFD, or 0xFFFC.

The alternate multi-flow packet application subtype is identified using any one of 0xFFFE, 0xFFFD, or 0xFFFC, which is different from a value of the alternate enhanced multi-flow packet application subtype.

The alternate multi-link multi-flow packet application subtype is identified using any one of 0xFFFE, 0xFFFD, or 0xFFFC, which is different from a value of the alternate enhanced multi-flow packet application subtype and a value of the alternate multi-flow packet application subtype.

In order to solve the above problem, the present invention also provides a system for a terminal to negotiate application support ability with a base station, the system comprising a terminal and a base station.

The terminal is configured to identify a null packet application subtype and an alternate enhanced multi-flow packet application subtype using different subtype values during session negotiation with the base station, and/or recognize the terminal supported application subtypes identified using different subtype values by the bases station.

The base station is configured to recognize a null packet application subtype and an alternate enhanced multi-flow packet application subtype using different subtype values during session negotiation with the terminal, and/or identify the base station supported application subtypes using different subtype values.

The alternate enhanced multi-flow packet application subtype indicates that an enhanced multi-flow packet application subtype has interoperation ability.

The null packet application subtype indicates that a multi-flow packet application subtype, an enhanced multi-flow packet application subtype, and a multi-link multi-flow packet application subtype have the interoperation ability.

The terminal and base station identify the null packet application subtype using 0xFFFD, and identify the alternate enhanced multi-flow packet application subtype using 0xFFFE, or the terminal and base station identify the null packet application subtype using 0xFFFE, and identify the alternate enhanced multi-flow packet application subtype using 0xFFFD.

In summary, the present invention provides a system and method for a terminal to negotiate application support ability with a base station. Regardless of versions of the terminal and base station, the base station can accurately recognize the terminal supported application subtypes and its ability from the application subtypes reported by the terminal, and further select correctly application subtypes bound to service flows.

PREFERRED EMBODIMENTS OF THE PRESENT INVENTION

Figure 1:
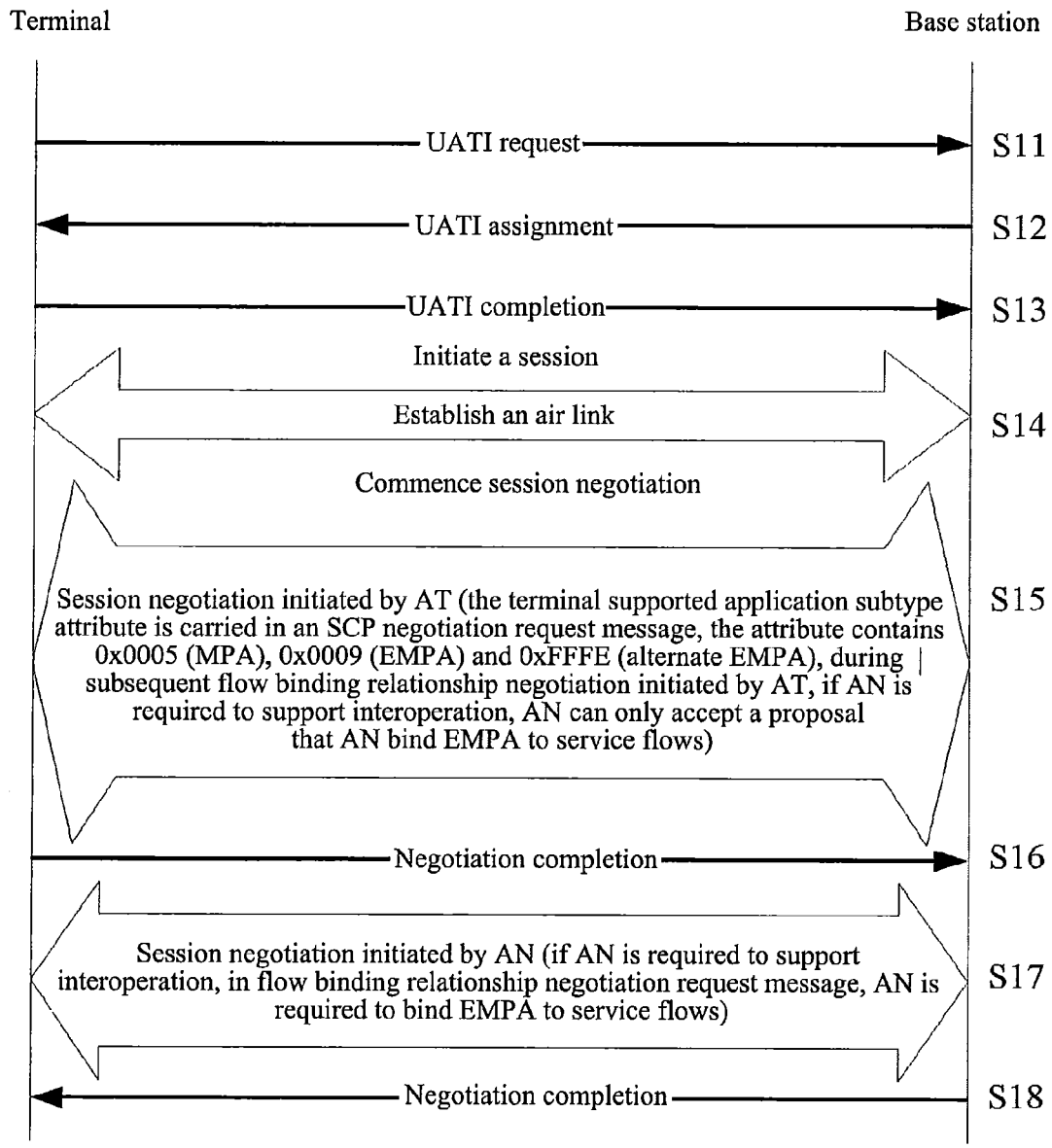
FIG. 1 is a flowchart of the first application example according to the present invention.

In order to solve the above computability problem, the present invention provides a system and method for a terminal to negotiate application support ability with a base station.

This embodiment provides a system for a terminal to negotiate application support ability with a base station, which comprises the terminal and the base station.

The terminal is configured to identify the terminal supported application subtypes using different subtype values during session negotiation with the base station, and/or recognize the base station supported application subtypes identified using different subtype values by the bases station.

The base station is configured to recognize the terminal supported application subtypes identified using different subtype values during session negotiation with the terminal, and/or identify the base station supported application subtypes identified using different subtype values.

Particularly, different application subtypes can be identified using different values in the following two ways.

(A) A null packet application subtype and an alternate enhanced multi-flow packet application subtype are identified using different subtype values during the session negotiation between the terminal and base station.

The alternate enhanced multi-flow packet application subtype indicates that an enhanced multi-flow packet application subtype has interoperation ability.

The null packet application subtype indicates that a multi-flow packet application subtype, an enhanced multi-flow packet application subtype, and a multi-link multi-flow packet application subtype have the interoperation ability.

The terminal and base station identify the null packet application subtype using 0xFFFD, and identify the alternate enhanced multi-flow packet application subtype using 0xFFFE, or the terminal and base station identify the null packet application subtype using 0xFFFE, and identify the alternate enhanced multi-flow packet application subtype using 0xFFFD.

(B) The following application subtypes are identified using different subtype values during the session negotiation between the terminal and base station:

an alternate enhanced multi-flow packet application subtype, an alternate multi-flow packet application subtype, and an alternate multi-link multi-flow packet application subtype.

The alternate enhanced multi-flow packet application subtype indicates that an enhanced multi-flow packet application subtype has interoperation ability.

The alternate multi-flow packet application subtype indicates that a multi-flow packet application subtype has the interoperation ability.

The alternate multi-link multi-flow packet application subtype indicates that a multi-link multi-flow packet application subtype has the interoperation ability.

The alternate enhanced multi-flow packet application subtype is identified using any one of 0xFFFE, 0xFFFD, or 0xFFFC.

The alternate multi-flow packet application subtype is identified using any one of 0xFFFE, 0xFFFD, or 0xFFFC, which is different from a value of the alternate enhanced multi-flow packet application subtype.

The alternate multi-link multi-flow packet application subtype is identified using any one of 0xFFFE, 0xFFFD, or 0xFFFC, which is different from a value of the alternate enhanced multi-flow packet application subtype and a value of the alternate multi-flow packet application subtype.

This embodiment provides a method for a terminal to negotiate application support ability with a base station, where various application subtypes are identified using different values during session negotiation between the terminal and base station.

Particularly, different application subtypes can be identified using different values in the following two ways:

In the first way:

In the C.R1001 specification, different subtype values are set for a null packet application subtype introduced into Version C.S0087-0_v2.0 and an alternate enhanced multi-flow packet application subtype introduced into Version C.S0087-0_v1.0. When the terminal carries the terminal supported application subtype attribute in a session configuration protocol (SCP) negotiation request message, the null packet application subtype and alternate enhanced multi-flow packet application subtype are identified using different subtype values.

Optionally, the subtype value of the alternate enhanced multi-flow packet application subtype is set to be 0xFFFE (or 0xFFFD), and the subtype value of the null packet application subtype is set to be 0xFFFD (or 0xFFFE). The two application subtypes described above can also be identified using other values, as long as the values are different. The particular values are not limited in the present invention.

In the second way:

In the C.R1001 specification, the null packet application subtype introduced into Version C.S0087-0_v2.0 is deleted, the original alternate enhanced multi-flow packet application subtype introduced into Version C.S0087-0_v1.0 is reserved, a new alternate multi-flow packet application subtype which is optionally named as alternate multi-flow packet application for eHRPD is added, and a new alternate multi-link multi-flow packet application subtype which is optionally named as alternate multi-link multi-flow packet application for eHRPD is added.

The alternate enhanced multi-flow packet application subtype is only used to indicate that the enhanced multi-flow packet application subtype has the interoperation ability, the alternate multi-flow packet application subtype is only used to indicate that the multi-flow packet application subtype has the interoperation ability, and the alternate multi-link multi-flow packet application subtype is only used to indicate that the multi-link multi-flow packet application subtype has the interoperation ability.

The terminal carries the terminal supported application subtype attribute in the SCP negotiation request message, and identifies the alternate enhanced multi-flow packet application subtype, alternate multi-flow packet application subtype, and alternate multi-link multi-flow packet application subtype using different subtype values.

Optionally, the alternate enhanced multi-flow packet application subtype is identified using any one of 0xFFFE, 0xFFFD, or 0xFFFC.

The alternate multi-flow packet application subtype is identified using any one of 0xFFFE, 0xFFFD, or 0xFFFC, which is different from a value of the alternate enhanced multi-flow packet application subtype.

The alternate multi-link multi-flow packet application subtype is identified using any one of 0xFFFE, 0xFFFD, or 0xFFFC, which is different from a value of the alternate enhanced multi-flow packet application subtype and a value of the alternate multi-flow packet application subtype.

The three application subtypes described above can also be identified using other values, as long as the values are different. The particular values are not limited in the present invention.

The present invention will be further described hereinafter by three application examples.

Application Example 1

FIG. 1 is a schematic flowchart of session negotiation of a terminal supporting Version C.S0087-0_v1.0. The correspondent base station can support Version C.S0087-0_v1.0 or Version C.S0087-0_v2.0. It is assumed that the terminal negotiates only a set of attributes (personality) with the base station.

In S11-S13, the terminal requests the base station to assign a unicast access terminal identifier (UATI) to it, and one session is initiated between the terminal and base station.

In S14, an air link is established between the terminal and base station to commence the session negotiation.

In S15, during the session negotiation initiated by the terminal, the terminal (AT) carries the ATSupportedApplicationSubtypes attribute, which contains the alternate enhanced multi-flow packet application subtype (provided that it is identified using 0xFFFE) in addition to the original application subtypes (e.g., 0x0005 and 0x0009) of HRPD, in a SCP negotiation request message. During flow binding negotiation initiated by the AT, if the base station (AN) is required to support interoperation, the AN can only accept a proposal that the AT bind the enhanced multi-flow packet application subtype to service flows.

In S16, upon completion of all protocol negotiations initiated by the terminal, the terminal sends a negotiation completion message to the base station.

In S17, during the session negotiation initiated by the AN, the AN determines that terminal supports only the enhanced multi-flow packet application subtype having interoperation ability based on the alternate enhanced multi-flow packet application subtype contained in the ATSupportedApplicationSubtypes attribute. Thus, if the AN needs to use the application subtype having the interoperation ability, it must binds the enhanced multi-flow packet application subtype to the service flows.

In S18, upon completion of all protocol negotiations initiated by the AN, the base station sends a negotiation completion message to the terminal.

Application Example 2

Figure 2:
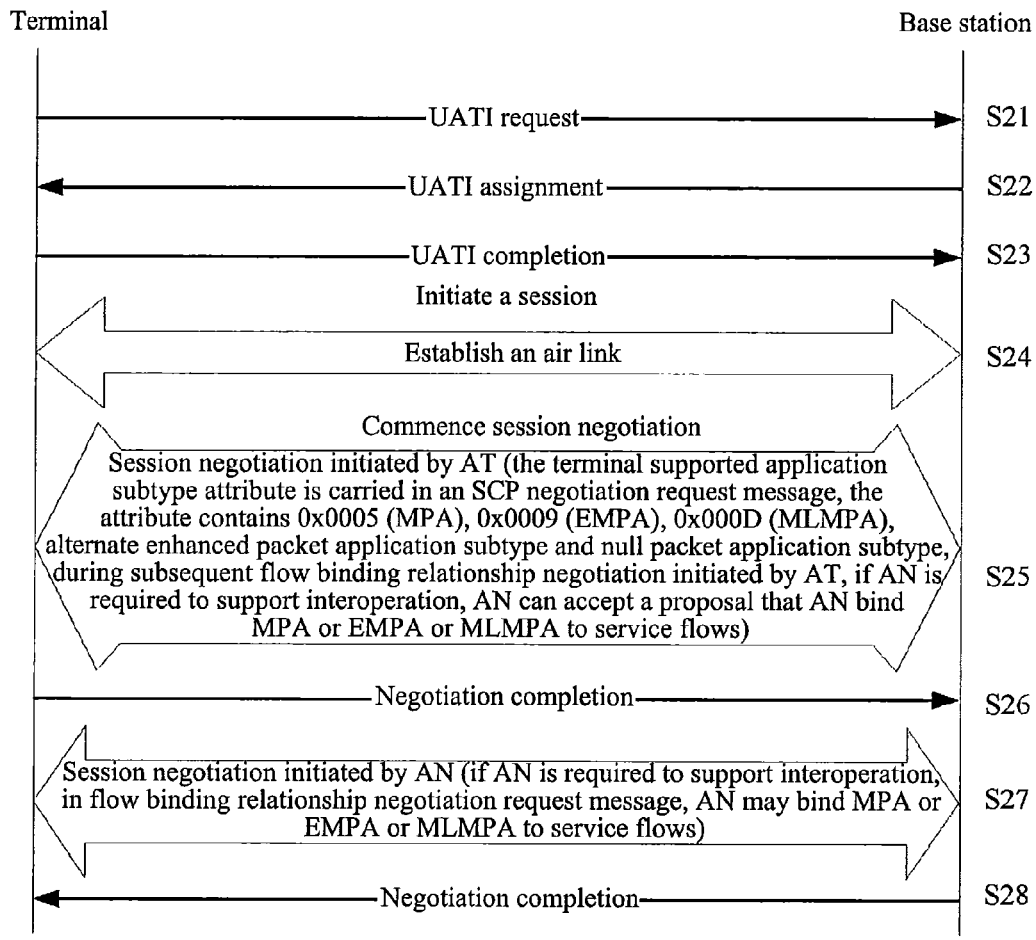
FIG. 2 is a flowchart of the second application example according to the present invention.

FIG. 2 is a schematic flowchart of session negotiation of a terminal supporting Version C.S0087-0_v2.0. The correspondent base station usually supports Version C.S0087-0_v2.0. It is assumed that the terminal negotiates only a set of attributes (personality) with the base station.

In S21-S23, the terminal requests the base station to assign a unicast access terminal identifier (UATI) to it, and one session is initiated between the terminal and base station.

In S24, an air link is established between the terminal and base station to commence the session negotiation.

In S25, during the session negotiation initiated by the terminal, the terminal is required carry the ATSupportedApplicationSubtypes attribute, which contains the alternate enhanced multi-flow packet application subtype (0xFFFE) and null packet application subtype (0xFFFD) in addition to the original application subtypes (e.g., 0x0005, 0x0009 and 0x000D) of HRPD or contains the null packet application subtype (0xFFFD) in addition to the original application subtypes (e.g., 0x0005, 0x0009 and 0x000D) of HRPD, in a SCP negotiation request message. During flow binding negotiation initiated by the AT, if the base station (AN) is required to support interoperation, the AN can accept a proposal that the AT bind any one of the multi-flow packet application subtype, enhanced multi-flow packet application subtype, and multi-link multi-flow packet application subtype to the service flows.

In S26, upon completion of all protocol negotiations initiated by the terminal, the terminal sends a negotiation completion message to the base station.

In S27, during the session negotiation initiated by the AN, the AN determines that terminal can support the multi-flow packet application subtype, enhanced multi-flow packet application subtype, and multi-link multi-flow packet application subtype which have interoperation ability based on the null packet application subtype contained in the ATSupportedApplicationSubtypes attribute. Thus, if the AN needs to use the application subtype having the interoperation ability, the AN can select any one of the packet application subtypes mentioned above to bind to the service flows.

In S28, upon completion of all protocol negotiations initiated by the AN, the base station sends a negotiation completion message to the terminal.

Application Example 3

Figure 3:
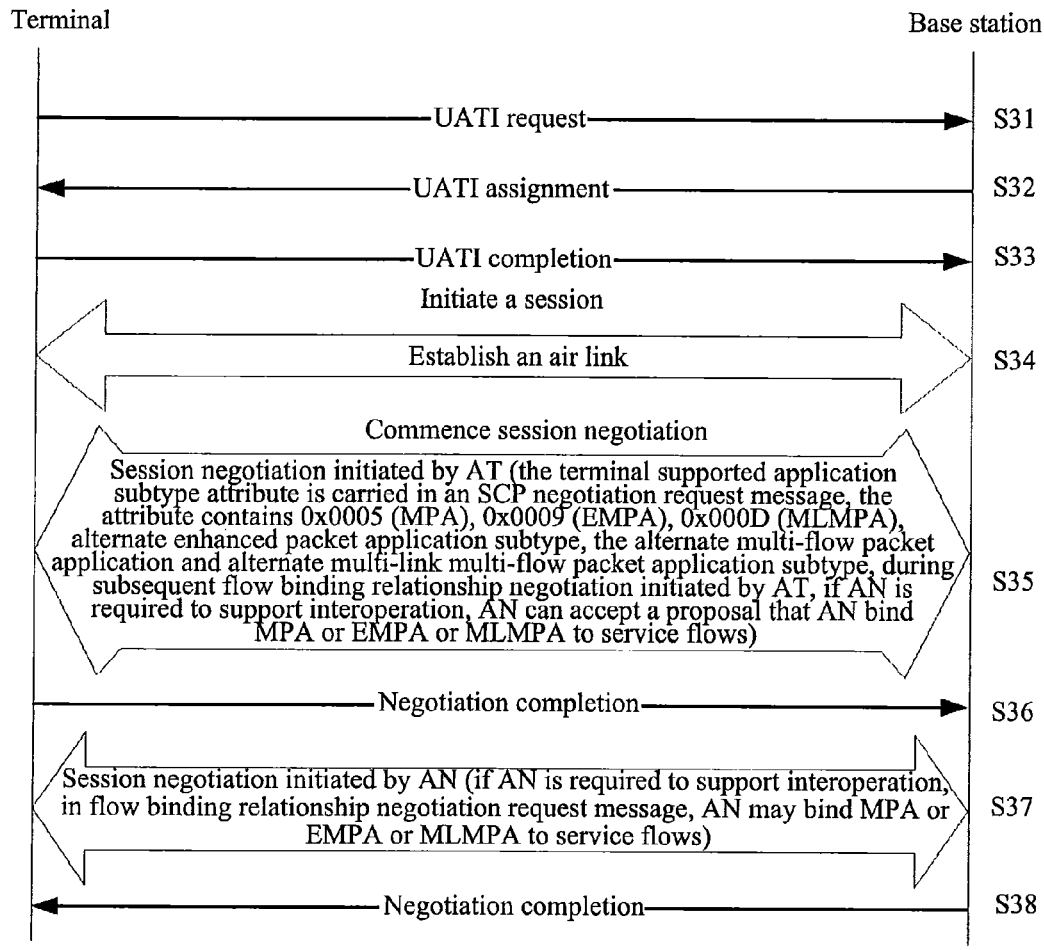
FIG. 3 is a flowchart of the third application example according to the present invention.

FIG. 3 is a schematic flowchart of session negotiation of a terminal supporting Version C.S0087-0_v2.0. The correspondent base station usually supports Version C.S0087-0_v2.0. It is assumed that the terminal negotiates only a set of attributes (personality) with the base station.

In S31-S33, the terminal requests the base station to assign a unicast access terminal identifier (UATI) to it, and one session is initiated between the terminal and base station. In S34, an air link is established between the terminal and base station to commence the session negotiation.

In S35, during the session negotiation initiated by the terminal, the terminal is required carry the ATSupportedApplicationSubtypes attribute, which contains the alternate enhanced multi-flow packet application subtype (0xFFFE), and the alternate multi-flow packet application (0xFFFD), and the alternate multi-link multi-flow packet application subtype (0xFFFC) in addition to the original application subtypes (e.g., 0x0005, 0x0009 and 0x000D) of HRPD in a SCP negotiation request message. During flow binding negotiation initiated by the AT, if the base station (AN) is required to support interoperation, the AN can accept a proposal that the AT bind any one of the multi-flow packet application subtype, enhanced multi-flow packet application subtype, and multi-link multi-flow packet application subtype to the service flows.

In S36, upon completion of all protocol negotiations initiated by the terminal, the terminal sends a negotiation completion message to the base station.

In S37, during the session negotiation initiated by the AN, the AN determines that terminal can support the multi-flow packet application subtype, enhanced multi-flow packet application subtype, and multi-link multi-flow packet application subtype which have interoperation ability based on the alternate enhanced multi-flow packet application subtype (0xFFFE), and the alternate multi-flow packet application (0xFFFD), and the alternate multi-link multi-flow packet application subtype (0xFFFC) contained in the ATSupportedApplicationSubtypes attribute. Thus, if the AN needs to use the application subtype having the interoperation ability, the AN can select any one of the packet application subtypes mentioned above to bind to the service flows.

In S38, upon completion of all protocol negotiations initiated by the AN, the base station sends a negotiation completion message to the terminal.

The first way described above may accommodate to the following several compatibility scenarios.

In the first scenario, when the terminal using Version C.S0087-0_v1.0 reports the original application subtype and alternate enhanced multi-flow packet application subtype (0xFFFE) in the ATSupportedApplicationSubtypes attribute, whether the base station uses Version C.S0087-0_v1.0 or Version C.S0087-0_v2.0, the base station can know definitively that the terminal only provides an interoperation function to the enhanced multi-flow packet application subtype. Furthermore, when the base station is required to use an application type having the interoperation function, the base station can correctly bind the enhanced multi-flow packet application subtype to the service flows.

In the second scenario, when the terminal using Version C.S0087-0_v2.0 reports the original application subtype, alternate enhanced multi-flow packet application subtype (0xFFFE) and null packet application subtype (0xFFFD) in the ATSupportedApplicationSubtypes attribute, if the correspondent base station uses Version C.S0087-0_v2.0, the base station can know definitively that the terminal provides an interoperation function to the multi-flow packet application subtype, enhanced multi-flow packet application subtype and multi-link multi-flow packet application subtype. The base station can select the correct application subtype to bind to the service flows according to service requirements.

In the third scenario, when the terminal using Version C.S0087-0_v2.0 reports the original application subtype, alternate enhanced multi-flow packet application subtype (0xFFFE) and null packet application subtype (0xFFFD) in the ATSupportedApplicationSubtypes attribute, if the correspondent base station uses Version C.S0087-0_v1.0, the base station cannot recognize the 0xFFFD application subtype at this point, but the base station at least knows that this terminal provides an interoperation function to the enhanced multi-flow packet application subtype. If the base station is required to use an application type having the interoperation function, the base station can still correctly bind the enhanced multi-flow packet application subtype to the service flows.

INDUSTRIAL APPLICABILITY

Regardless of versions of the terminal and base station, the base station can accurately recognize the terminal supported application subtypes and its ability from the application subtypes reported by the terminal, and further select correctly application subtypes bound to service flows.

What we claim is:

1. A method for a terminal to negotiate application support ability with a base station comprising:

identifying by both the terminal and the base station the following application subtypes using different subtype values during session negotiation between the terminal and the base station:

an alternate enhanced multi-flow packet application subtype, an alternate multi-flow packet application subtype, and an alternate multi-link multi-flow packet application subtype, wherein the alternate enhanced multi-flow packet application subtype indicates that an enhanced multi-flow packet application subtype has interoperation ability;

the alternate multi-flow packet application subtype indicates that a multi-flow packet application subtype has the interoperation ability;

the alternate multi-link multi-flow packet application subtype indicates that a multi-link multi-flow packet application subtype has the interoperation ability;

wherein the alternate enhanced multi-flow packet application subtype is identified using any one of 0xFFFE, 0xFFFD, or 0xFFFC;

the alternate multi-flow packet application subtype is identified using any one of 0xFFFE, 0xFFFD, or 0xFFFC, which is different from a value of the alternate enhanced multi-flow packet application subtype; and the alternate multi-link multi-flow packet application subtype is identified using any one of 0xFFFE, 0xFFFD, or 0xFFFC, which is different from a value of the alternate enhanced multi-flow packet application subtype and a value of the alternate multi-flow packet application subtype.

2. A system for a terminal to negotiate application support ability with a base station, the system comprising a terminal and a base station, wherein the terminal is configured to identify the terminal supported application subtypes using different subtype values during session negotiation with the base station, and/or recognize the base station supported application subtypes identified using different subtype values by the bases station; and the base station is configured to recognize the terminal supported application subtypes identified using different subtype values by the terminal during session negotiation with the terminal, and/or identify the base station supported application subtypes using different subtype values;

wherein the terminal and base station are configured to identify the following application subtypes using different subtype values during the session negotiation between the terminal and base station;

an alternate enhanced multi-flow packet application subtype, an alternate multi-flow packet application subtype, and an alternate multi-link multi-flow packet application subtype, and wherein the alternate enhanced multi-flow packet application subtype indicates that the enhanced multi-flow packet application subtype has the interoperation ability;

the alternate multi-flow packet application subtype indicates that the multi-flow packet application subtype has the interoperation ability; and the alternate multi-link multi-flow packet application subtype indicates that the multi-link multi-flow packet application subtype has the interoperation ability; and wherein the alternate enhanced multi-flow packet application subtype is identified using any one of 0xFFFE, 0xFFFD, or 0xFFFC;

the alternate multi-flow packet application subtype is identified using any one of 0xFFFE, 0xFFFD, or 0xFFFC, which is different from a value of the alternate enhanced multi-flow packet application subtype; and the alternate multi-link multi-flow packet application subtype is identified using any one of 0xFFFE, 0xFFFD, or 0xFFFC, which is different from a value of the alternate enhanced multi-flow packet application subtype and a value of the alternate multi-flow packet application subtype.

* * * * *